United States Patent [19]
van Erven

[11] Patent Number: 5,691,731
[45] Date of Patent: Nov. 25, 1997

[54] CLOSED SLOT ANTENNA HAVING OUTER AND INNER MAGNETIC LOOPS

[75] Inventor: Cornelis Maria Johannes van Erven, Enschede, Netherlands

[73] Assignee: Texas Instruments Incorporated, Dallas, Tex.

[21] Appl. No.: 481,010

[22] Filed: Jun. 7, 1995

Related U.S. Application Data

[62] Division of Ser. No. 76,036, Jun. 15, 1993, Pat. No. 5,432,518.

[51] Int. Cl.$^6$ ............................................. H01Q 11/12
[52] U.S. Cl. ...................... 343/742; 343/788; 343/842; 343/867
[58] Field of Search .................... 343/742, 743, 343/788, 842, 866, 867

[56] References Cited

U.S. PATENT DOCUMENTS

| | | | |
|---|---|---|---|
| 1,683,773 | 9/1928 | Goldsmith | 343/867 |
| 2,202,368 | 5/1940 | Berndt | 343/866 |
| 3,576,567 | 4/1971 | Shively | 343/704 |
| 3,973,263 | 8/1976 | Green | 343/842 X |
| 4,373,163 | 2/1983 | Vandebult | 343/842 |
| 4,866,455 | 9/1989 | Lichtblau | 343/867 X |
| 4,911,217 | 3/1990 | Dunn et al. | 152/152.1 |
| 4,994,817 | 2/1991 | Munson et al. | 343/770 |
| 5,198,826 | 3/1993 | Ito | 343/726 |
| 5,248,989 | 9/1993 | Murdoch | 343/842 X |
| 5,276,430 | 1/1994 | Granovsky | 340/572 |

Primary Examiner—Donald T. Hajec
Assistant Examiner—Tho Phan
Attorney, Agent, or Firm—Mark A. Valetti; Wade James Brady; Richard L. Donaldson

[57] ABSTRACT

An RF identification system having an interrogator operable to send RF interrogations to a transponder and to receive RF responses from the transponder. The interrogator is in electrical communication with a closed slot antenna. The closed slot antenna is formed by an an outer visual magnetic loop and an inner visual magnetic loop such that the antenna has a superior magnetic field when compared to a balanced double loop antenna with an equal area and a superior far-field noise suppression when compared to the single loop antenna. The antenna receives said RF responses from the transponder and provides said RF responses to said interrogator. Other devices, systems and methods are also disclosed.

8 Claims, 4 Drawing Sheets

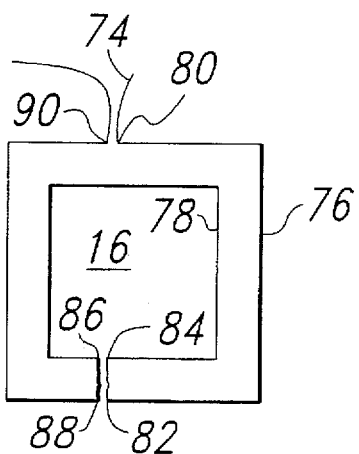
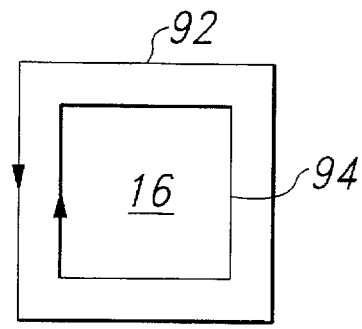
Fig. 4    Fig. 5
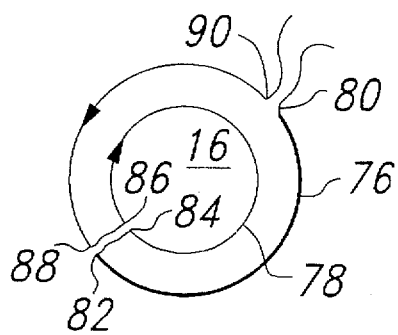
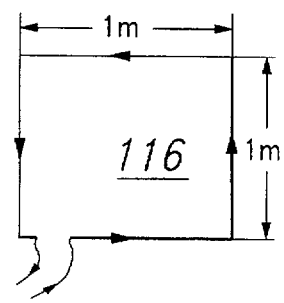
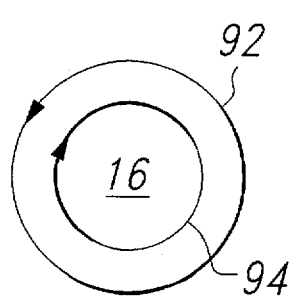
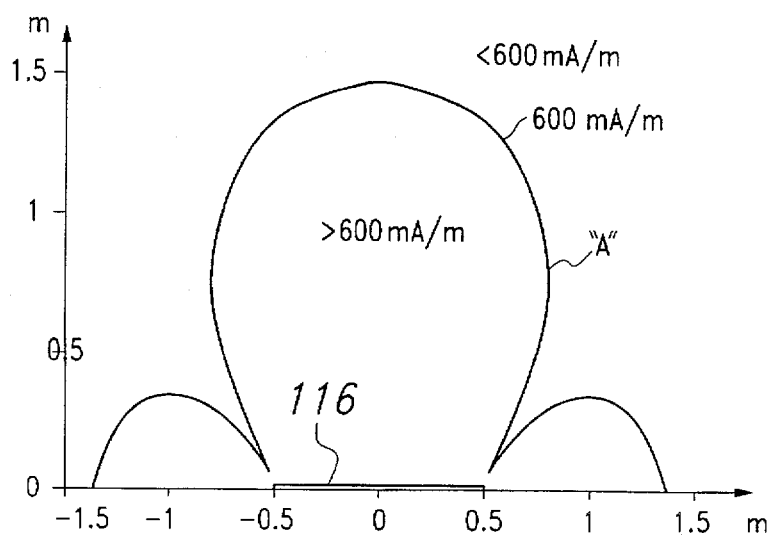
Fig. 6    Fig. 8 PRIOR ART
Fig. 7    Fig. 9

# 5,691,731

CLOSED SLOT ANTENNA HAVING OUTER AND INNER MAGNETIC LOOPS

This is a divisional of application Ser. No. 08/076,036, filed Jun. 15, 1993 now U.S. Pat. No. 5,432,518.

CROSS REFERENCE TO RELATED PATENTS

The following coassigned patent applications are incorporated by reference:

| Pat No./Appl. No. | Filing Date | TI Case No. |
|---|---|---|
| 5,053,774 | 2/31/91 | TI-12797A |
| 07/981,635 | 11/25/92 | TI-16688 |

FIELD OF THE INVENTION

This invention generally relates to a closed slot antenna having an outer magnetic loop and an inner magnetic loop to reduce the effects of homogeneous noise with minimal sacrifice of magnetic field performance.

BACKGROUND OF THE INVENTION

Without limiting the scope of the invention, its background is described in connection with tire identification systems, as an example. In tire interrogation systems a transponder is provided in a vehicle tire for interrogation by a reader or interrogator. The interrogator typically operates with an antenna that is at a fixed location by which the tire will pass. Other embodiments include applications in which an interrogator is mobile and is moved about to identify tires with which the interrogator comes in proximity. It is desirable for the interrogator and antenna to be sensitive to signals received from the transponder located in close proximity, but relatively insensitive to noise from sources located at a greater distance.

Prior art approaches include using single loop antennas with or without interrogator filters that filter all but a small frequency band of interest from the received signal. Other prior art approaches include using balanced double loop antennas that have two or more loops of opposite polarities and equal size to cancel far field or homogeneous noise.

SUMMARY OF THE INVENTION

The preferred embodiment of the present invention overcomes the difficulties associated with the prior approaches mentioned above. The preferred embodiment uses a closed slot antenna having an outer magnetic loop and an inner magnetic loop. The outer loop and said inner loop are generally concentric about a center point. The inner magnetic loop will have a homogeneous noise component with a phase opposite from that of the outer magnetic loop. The preferred embodiment closed slot antenna has a superior magnetic field when compared to a balanced double loop antenna with an equal area. The preferred embodiment closed slot antenna has a superior far-field noise suppression when compared to the single loop antenna. While the single loop antenna provides the best possible magnetic field among antennas of equal areas, the single loop provides no far-field noise suppression. Thus, for a small trade-off of magnetic field performance compared with the single loop antenna, the preferred embodiment antenna provides a substantial noise performance gain. The use of the preferred embodiment of the present invention reduces or eliminates the amount of filtering of the received signal that is required.

The desirability of reducing the filtering required includes simplifying the circuitry for higher reliability and lower manufacturing costs.

BRIEF DESCRIPTION OF THE DRAWINGS

FIG. 4 is a top view of a rectangular closed slot antenna;

FIG. 5 is a top view of the magnetic behavior of a rectangular closed slot antenna;

FIG. 6 is a top view of a circular closed slot antenna;

FIG. 7 is a top view of the magnetic behavior of a circular closed slot antenna;

FIG. 8 is a top view of a prior art rectangular antenna;

FIG. 9 is a graph of the isomagnetic field about the prior art rectangular antenna of FIG. 8;

Corresponding numerals and symbols in the different figures refer to corresponding parts unless otherwise indicated.

DETAILED DESCRIPTION OF PREFERRED EMBODIMENTS

Figure 1:
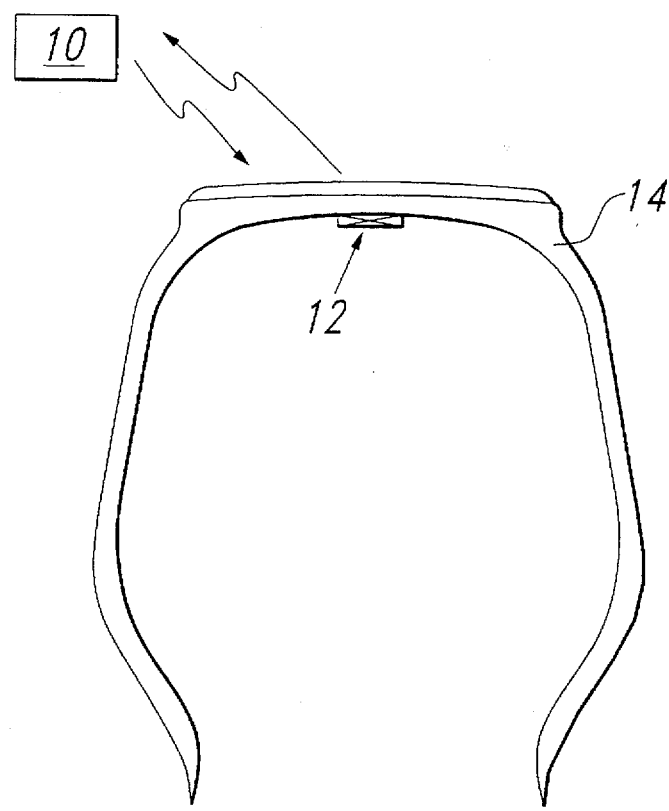
FIG. 1 is a block circuit diagram of a preferred arrangement of an interrogation unit and a transponder unit.

Referring now to FIG. 1, an embodiment in which the preferred antenna might be used will be described. The embodiment includes an interrogator 10 and a responder unit or transponder 12. The interrogator 10 may be located within a fixture having a fixed antenna 16 for tire identification or may be a portable unit which has an associated portable antenna 16 for interrogating tires 14 at a variety of locations. The transponder 12 is preferably of the type described in U.S. patent application Ser. No. 07/981,635, assigned to Texas Instruments Deutschland GmbH and incorporated by reference herein. Alternatively, transponder 12 may be of the type described in U.S. Pat. No. 5,053,774, also assigned to Texas Instruments Deutschland GmbH and incorporated by reference herein. Various modifications and combinations of the illustrative embodiments, as well as other embodiments of the invention, will be apparent to persons skilled in the art upon reference to the description. It is therefore intended that the appended claims encompass any such modifications or embodiments.

Figure 2:
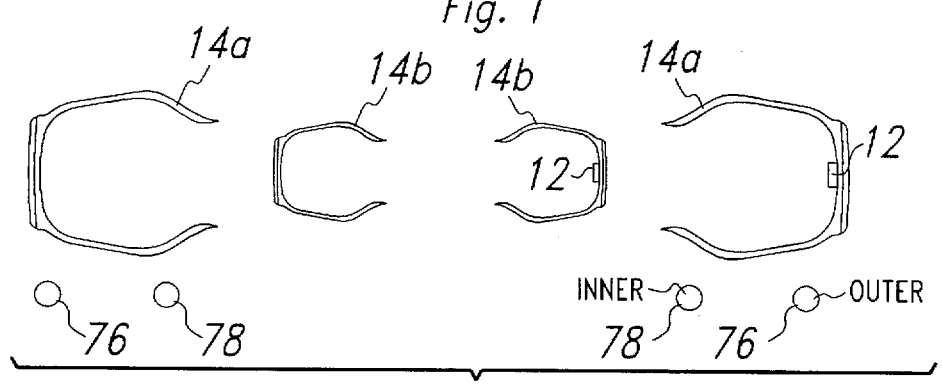
FIG. 2 is a cross-sectional side view of a preferred embodiment arrangement by which small or large tires may be identified.

FIG. 2 shows a cross-sectional side view of a preferred embodiment in which a large tire 14a, or alternatively, a small tire 14b may be placed in proximity to the outer loop 76 and the inner loop 74 of the antenna 16. The tires 14a, 14b will preferably be concentric with the antenna 16. Although the exact placement of the tire will not be particularly critical, as will be discussed hereinafter, preferably the tires will be placed such that the transponder 12 is not located directly above either the inner loop 74 or the outer loop 76.

Figure 3:
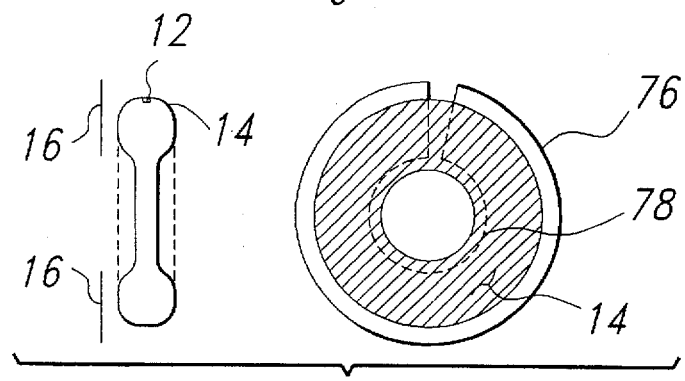
FIG. 3 shows a side view and a top view of a preferred embodiment arrangement.

FIG. 3 shows a side view and a top view of the tire 14 in proximity to the antenna 16. Because of the symmetry of the tire 14 and antenna 16 arrangement, the transponder 12 might be at any location about the tire's perimeter without adversely affecting the performance of the communication between the interrogator 10 and the transponder 12.

FIGS. 4–5 illustrate the form and characteristics of a rectangular slot antenna in accordance with an embodiment of the present invention. FIG. 4 shows a closed slot antenna 16. The antenna 16 has a wire 74 that forms an outer magnetic loop 76 and an inner magnetic loop 78. The outer loop 76 and the inner loop 76 are generally concentric about a center point. The wire 74 goes in a first angular direction with respect to the center point from a first point 80 on the outer loop 76 to a second point 82 on the outer loop. This trip forms a first portion of the outer loop. The wire 74 then reverses its path inwardly to a third point 84 on the inner loop 78 from where it goes in a second angular direction. The path of the wire 74 continues until it nearly reaches a fourth point 86 on the inner loop 78. The fourth point 86 is in non-contacting, close proximity to the third point 84. The path of the wire 74 then again reverses direction. This time the wire 74 reverses direction outwardly to a fifth point 88 on the outer loop 76. From fifth point 88 the wire 74 continues in the first angular direction about a second portion of the outer loop 76 to a sixth point 90 on the outer loop 76. The fifth point 88 is in non-contacting, close proximity to the second point 82. Referring now to FIG. 5, outer magnetic loop 76 forms a virtual outer closed magnetic loop 92 between said first point 80 and said sixth point 90. Inner magnetic loop 82 and a virtual inner closed magnetic loop between said third point 84 and said sixth point 86.

FIGS. 6–7 illustrate the form and characteristics of a circular slot antenna in accordance with an embodiment of the present invention in the same form as the rectangular slot antenna of FIGS. 4–5. Virtually any closed shape could be used in place of the rectangular or circular slot antennas.

FIGS. 8 and 9 illustrate the form and isomagnetic field patterns, respectively, of a prior art rectangular antenna 116. As shown in FIG. 8, this antenna has an antenna surface of 1 m×1 m=1 m². The line "A" of FIG. 9 shows the isomagnetic field line of 600 mA/m with a total antenna current of 15 A. The field of FIG. 9 is a cross-section through the center of the square and intersects perpendicularly with two sides of the square. The prior art rectangular antenna 116 does not provide cancellation of far-field signals or other homogeneous noise. Thus, the rectangular antenna 116 has a noise surface of 1 m². The isomagnetic field pattern shows the rectangular antenna 116 to have an excellent isomagnetic field pattern with a large main lobe and much diminished side lobes. The large main lobe will provide a strong powering and communication signal for the transponder 12 over a fairly large area.

Figure 10:
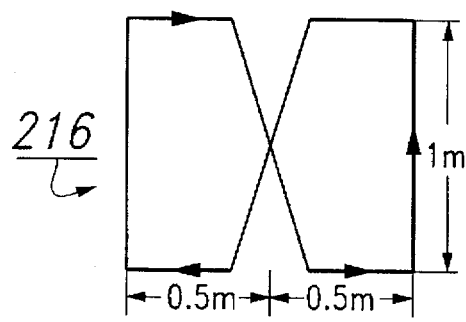
FIG. 10 is a top view of a prior art double loop balanced antenna.
Figure 11:
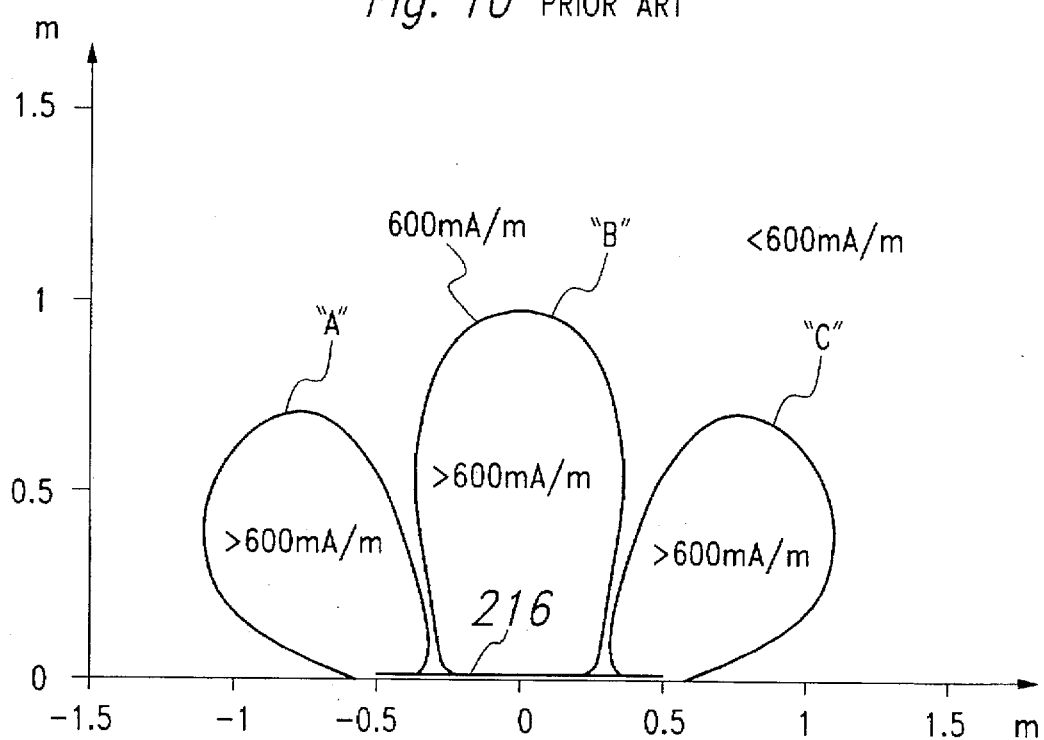
FIG. 11 is a graph of the isomagnetic field about the prior art double loop balanced antenna of FIG. 10.

FIGS. 10 and 11 illustrate the form and isomagnetic field patterns, respectively, of a prior art double loop balanced antenna 216. As shown in FIG. 10, this antenna has an antenna surface of 2×(0.5 m×1 m)=1 m². The lines "A", "B", and "C" of FIG. 11 shows the isomagnetic field line of 600 mA/m with a total antenna current of 15 A. The field of FIG. 10 is a cross-section through the center of the square and intersects perpendicularly with two long (1 m) sides of the double loop. Although this prior art antenna 216 provides complete cancellation of far-field signals or other homogeneous noise (noise surface=0 m²), the antenna's 216 isomagnetic field pattern is quite poor. FIG. 11 shows the double loop balanced antenna 216 to have a small and narrow main lobe and prominent side lobes that contain almost as much energy as the main lobe. Powering and communication for the transponder 12 will be quite inefficient in this embodiment.

Figure 12:
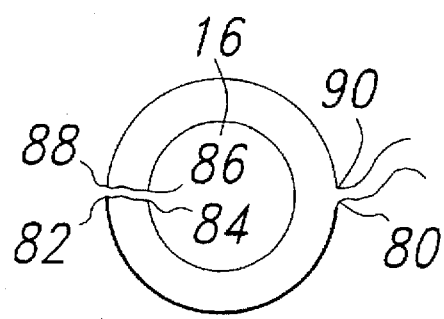
FIG. 12 is a top view of the circular antenna of the present invention.
Figure 13:
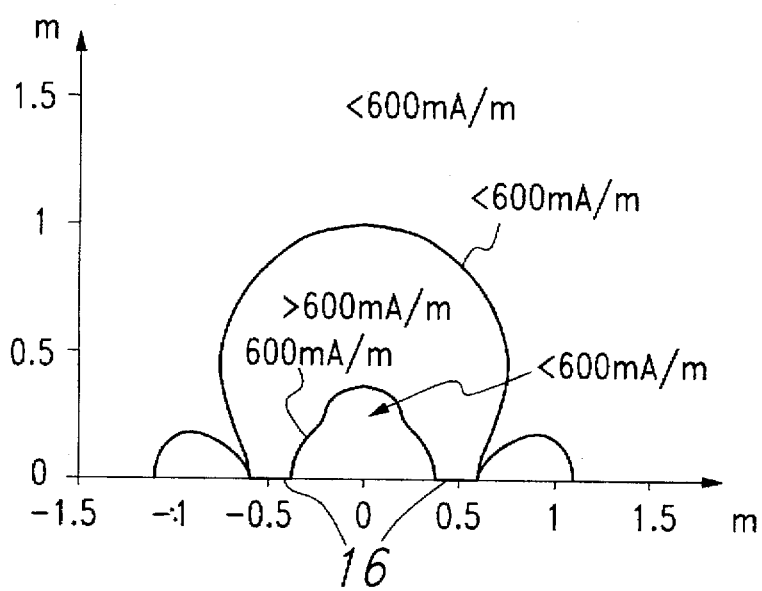
FIG. 13 is a graph of the isomagnetic field about the preferred embodiment antenna of FIG. 12.

FIGS. 12 and 13 illustrate the form and isomagnetic field patterns, respectively, of a preferred embodiment circular slot antenna 16. FIG. 12 shows this antenna to have an antenna surface of $\pi \times (0.56 \text{ m})^2 = 1 \text{ m}^2$. As further shown in FIG. 12, this antenna has an antenna noise surface of $\pi \times [(0.56 \text{ m})^2 - (0.4 \text{ m})^2] = 0.5 \text{ m}^2$. The lines of FIG. 11 shows the isomagnetic field line of 600 mA/m with a total antenna current of 15 mA. The preferred embodiment antenna 16 decreases the antenna noise surface by 50% over the single loop rectangular antenna 116. The preferred embodiment antenna 16 has a superior magnetic field to that of the double loop balanced antenna 216. The preferred embodiment antenna 16 keeps most of its energy in the desired main lobe. Further, the preferred embodiment antenna 16 has an orientation to the transponder antenna 57 similar to that of the single loop rectangular antenna 116. The preferred embodiment antenna 16 also avoids the large nulls that are present in the magnetic field pattern of the double loop balanced antenna 216 between its main lobe and its side lobes. Still further, the preferred embodiment antenna 16 has a field pattern that is more nearly symmetric than that of the double loop balanced antenna 216. The field of FIG. 10 is any cross-section through the center of the concentric circles. The field pattern is circularly symmetrical about the antenna 16.

Figure 14:
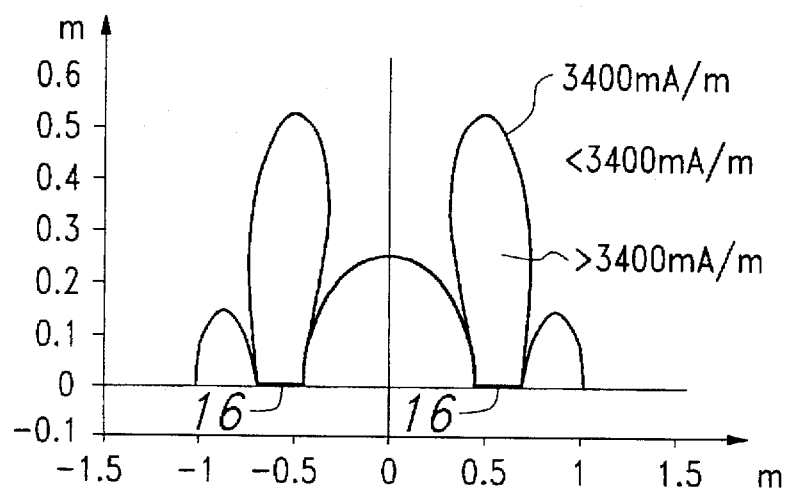
FIG. 14 is a graph of the isomagnetic field about a second preferred embodiment antenna.

FIG. 14 shows the isomagnetic field patterns, respectively, of a second preferred embodiment circular slot antenna 16. This antenna has a slightly different inner and outer loop radius, although this difference is not critical. FIG. 14 is included to show the differing field patterns that might be needed for programming of a different type of transponder 12. The previous field pattern of FIG. 13 was generated by an interrogator 10 and antenna 16, which was optimized for 10 cm transponders. The 10 cm transponders 12 have a larger coupling coil such that this type of transponder 12 needs a field of only 80 mA/m for a time of 50 ms to charge the transponder 12 with sufficient energy for operation. The field of FIG. 14 was generated by an interrogator 10 and an antenna 16 that is optimized for smaller transponders which required a charging field of 1300 mA/m for a time of 50 ms to charge the transponder 12 with sufficient energy for normal reading operations. Writing or programming this type of transponder 12 requires yet greater field of 3400 mA/m for 50 ms in order to be sufficiently charged. The isomagnetic field lines for 3400 mA/m are shown in FIG. 14. As can be seen in FIG. 14, to remain within the required magnetic field strength the vertical distance of the transponder 12 must be less than approximately 5 meters. Further, it should be noticed that as mentioned the transponder 12 is preferably not located above the inner or outer loop 76,74 of the antenna 16 in order to avoid being positioned within the null points thereabove. This alternate embodiment still maintains the advantages described for the first preferred embodiment circular slot antenna 16 of FIGS. 14–15. The physical antenna dimensions for the antenna 16 generating the field of FIG. 14 will be the same as FIG. 12 with a simple substitution of the inner and outer radiuses.

The sole table, below, provides an overview of the embodiments and the drawings:

TABLE

| Drawing Element | Generic Term | Preferred or Specific Term | Alternate Terms |
|---|---|---|---|
| 10 | Interrogator | Interrogator | Reader |
| 12 | Transponder | Transponder | Responder |
| 14, 14a, 14b | Tire | | |
| 16 | Closed Slot Antenna | Circular Slot Antenna Interrogator LF Antenna | Rectangular Slot Antenna |
| 74 | Wire | Antenna Wire | |
| 76 | Outer Loop | Outer Magnetic Loop | |
| 78 | Inner Loop | Inner Magnetic Loop | |
| 80 | First Point | | |
| 82 | Second Point | | |
| 84 | Third Point | | |
| 86 | Fourth Point | | |
| 88 | Fifth Point | | |
| 90 | Sixth Point | | |
| 92 | Outer Loop | Outer Virtual Magnetic Loop | |
| 94 | Inner Loop | Inner Virtual Magnetic Loop | |
| 116 | Prior Art Antenna | Single Loop Rectangular Antenna | |
| 216 | Prior Art Antenna | Double Loop Balanced Antenna | |

A few preferred embodiments have been described in detail hereinabove. It is to be understood that the scope of the invention also comprehends embodiments different from those described, yet within the scope of the claims.

For example, "microcomputer" in some contexts is used to mean that microcomputer requires a memory and "microprocessor" does not. The usage herein is that these terms can also be synonymous and refer to equivalent things. The phrase "processing circuitry" or "control circuitry" comprehends ASICs (application specific integrated circuits), PAL (programmable array logic), PLAs (programmable logic arrays), decoders, memories, non-software based processors, or other circuitry, or digital computers including microprocessors and microcomputers of any architecture, or combinations thereof. Memory devices include SRAM (static random access memory), DRAM (dynamic random access memory), pseudo-static RAM, latches, EEPROM (electrically-erasable programmable read-only memory), EPROM (erasable programmable read-only memory), registers, or any other memory device known in the art. Words of inclusion are to be interpreted as nonexhaustive in considering the scope of the invention.

Implementation is contemplated in discrete components or fully integrated circuits in silicon, gallium arsenide, or other electronic materials families, as well as in optical-based or other technology-based forms and embodiments. It should be understood that various embodiments of the invention can employ or be embodied in hardware, software or microcoded firmware.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A closed slot antenna, said antenna comprising a wire which is configured to form an antenna having an outer magnetic loop and an inner magnetic loop, said outer loop and said inner loop being generally concentric about a center point, said wire proceeding in a first angular direction with respect to said center point from a first point on the outer loop to a second point on the outer loop thereby traversing a first portion of the outer loop, said wire then reversing direction inwardly to a third point on the inner loop and proceeding in a second angular direction nearly completely about the inner magnetic loop until reaching a fourth point on the inner loop, said fourth point in non-contacting, close proximity to said third point, and reversing direction outwardly to a fifth point on the outer loop, and proceeding in said first angular direction about a second portion of the outer loop to a fifth point on the outer loop, said sixth point in non-contacting, close proximity to said second point thereby forming a virtual inner closed magnetic loop between said third point and said fourth point and a virtual outer closed magnetic loop between said first point and said sixth point.

2. The antenna of claim 1 wherein said loops are rectangular.

3. The antenna of claim 1 wherein said inner loop has a different geometric shape than said outer loop.

4. An antenna, said antenna comprising a single conductor arranged such that said conductor originates at a first point, forms a first loop where a second point of said conductor lies near to said first point, substantially closing said first loop without forming an electrical contact between said first and second points, and forms a second loop originating at said second point where a third point lies near to said first point, substantially closing said second loop without forming an electrical contact between said first and third points, said second loop being substantially parallel to said first loop.

5. The antenna of claim 4 wherein said first loop is substantially circular.

6. The antenna of claim 5 wherein said second loop is substantially circular.

7. The antenna of claim 4 wherein said first and second loops have different geometric shapes.

8. An antenna formed of a single conductor which has a first end and a second end, said antenna comprising:
   an outer loop which is formed from said single conductor such that a portion of said conductor extends from said first end to a first point and another portion of said conductor extends from said second end to a second point, said first and second points in non-contacting but close proximity to each other;
   an inner loop which is formed from said single conductor such that said a portion of said single conductor extends inwardly from said first point to a third point then extends from said third point to a fourth point and then extends outwardly to said second point, said third and fourth points being in non-contacting but close proximity to each other; and
   wherein said inner and outer loops are substantially concentric about a point, and wherein a current flowing on said single conductor will flow in one direction on said outer conductor and in a generally opposite direction on said inner conductor.

* * * * *